Figure 1:
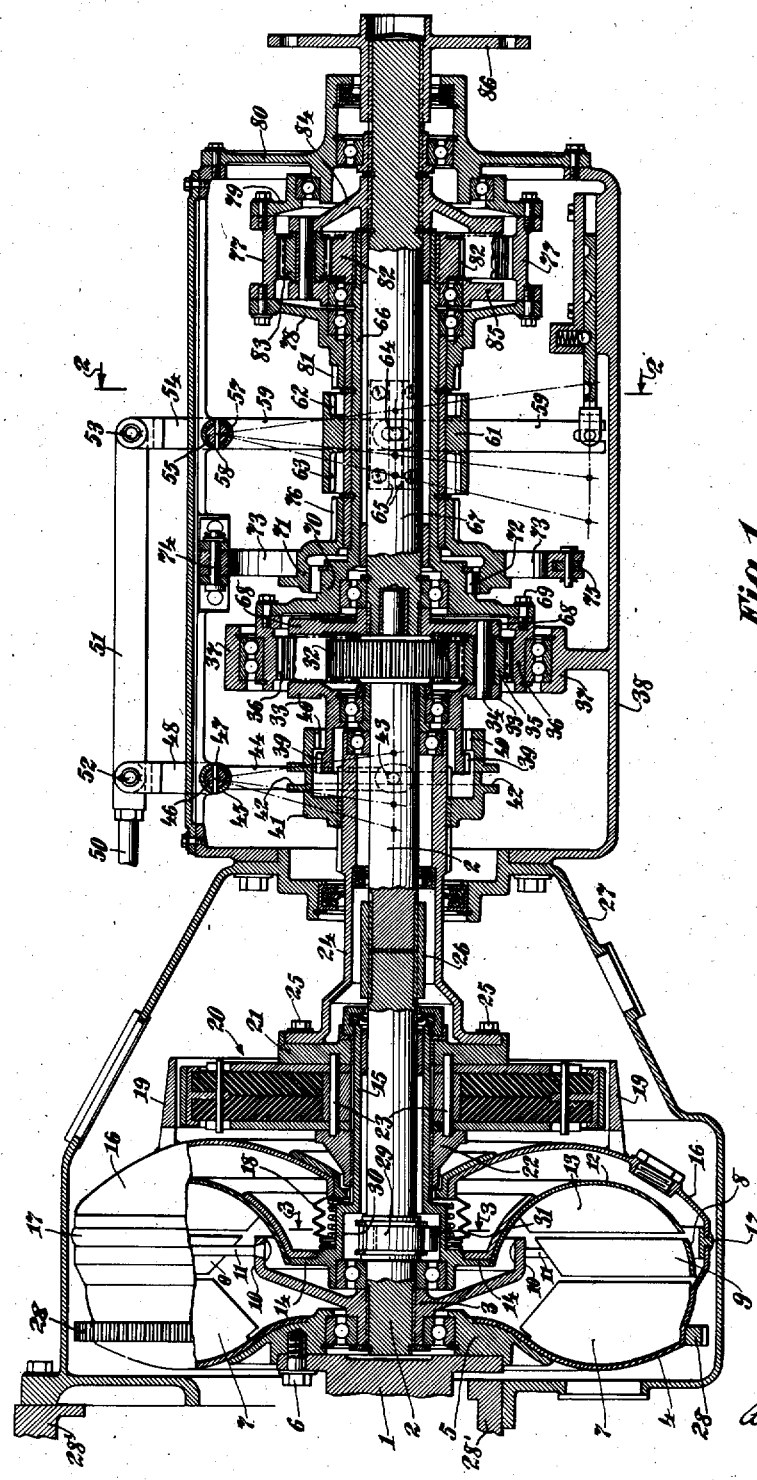

Aug. 7, 1945.　　　　A. D. PENTZ　　　　2,381,772
POWER TRANSMISSION MECHANISM
Filed Jan. 12, 1943　　　3 Sheets-Sheet 2

INVENTOR.
Albert D. Pentz,
BY
Alexander Chessin
his ATTORNEY.

Aug. 7, 1945.                A. D. PENTZ                2,381,772
                       POWER TRANSMISSION MECHANISM
                          Filed Jan. 12, 1943          3 Sheets-Sheet 3
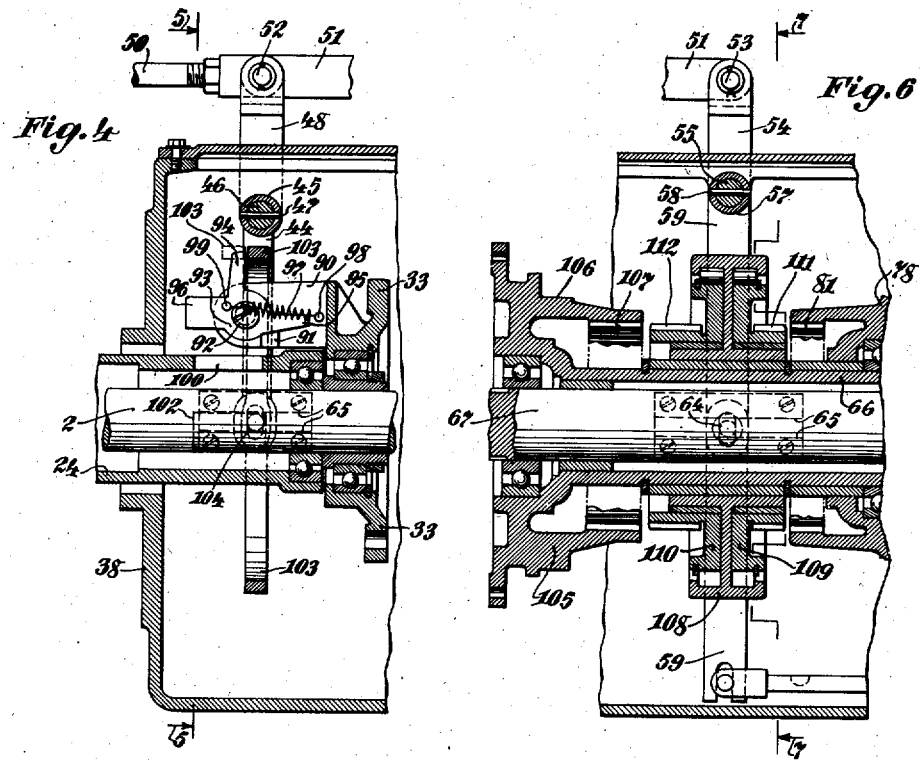
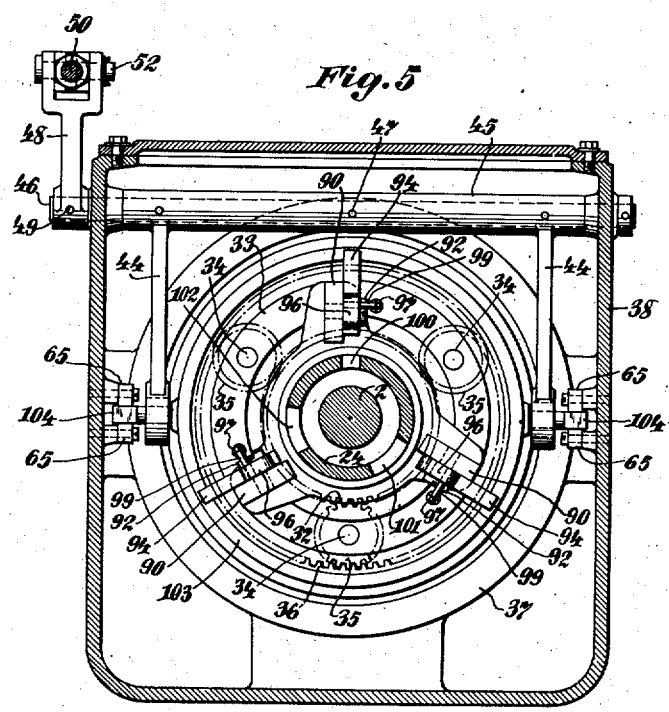
INVENTOR.
Albert D. Pentz,
BY Alexander Chesson
his ATTORNEY.

Patented Aug. 7, 1945

2,381,772

UNITED STATES PATENT OFFICE 2,381,772

POWER TRANSMISSION MECHANISM

Albert D. Pentz, New York, N. Y.

Application January 12, 1943, Serial No. 472,118

38 Claims. (Cl. 74—189.5)

My invention relates to power transmission and, more particularly, to such transmission in motor vehicles.

The present invention is in part, a continuation of, and, in part, an improvement on the invention forming the subject matter of my copending application, Ser. No. 421,530, filed December 4, 1941, now Patent No. 2,350,810, and includes all of the features described and claimed therein, but it embodies important additional features constituting an appreciable advance over the prior art, including my aforesaid prior invention. The general object of my prior invention is to create a power transmission which automatically adjusts itself to the load, effecting a torque amplification when the driving torque is insufficient to overcome the load on the driven shaft and passing into a direct transmission in a state of slippage when the driving torque and the load torque are substantially equalized, and then, also automatically, into a direct 1:1 drive without slippage when the rotation of the driven shaft attains a predetermined speed. All of these features are retained in the present invention, but a number of additional objects are achieved by the present improved transmission. Thus, it is an object of the present invention to permit a total separation of the low speed range from the direct drive range of the transmission, if and when so desired or when advisable according to circumstances. Another object is to reduce power losses by increasing the efficiency of the transmission, more particularly in the low speed range and when operating in reverse. A further object is to automatically shift power from the high speed mechanism to the low speed mechanism and back again, one of the results of such shifting being a greater torque amplification. Still another object is to increase the efficiency of the fluid coupling forming a part of the transmission, again, in the low speed range, with or without the addition of an over-running clutch. It is also an object of the present invention to produce a power transmission wherein a true neutral position is really and fully materialized, and all undue drag on the motor is eliminated. It is a further object of the present invention to secure all of the above enumerated advantages by making a single change in the design of my aforesaid prior invention, namely, by breaking up the direct connection between the driving and the driven mechanisms into two parts and providing means for releasably locking the two parts together. A still further object is to make the latter means semi-automatic and free from the troubles of gear shifting. It is also an object of the present invention to extend the feature of a direct drive in a state of slippage, available in my prior invention only for the forward drive, to include also the drive in reverse. Other objects, not specifically mentioned above, will become apparent from the specification which follows and from the accompanying drawings. However, before passing on to the specification, it is well to note that, in the present invention, as in my aforesaid prior invention, the speed rate change mechanism may be designed with any suitable reduction gear assembly, and that the planetary gear assemblies are shown in the illustrations not because the device is limited to this particular form of reduction gears, but because it is the form which I prefer, especially for motor vehicle power transmissions, and also, because one form is ample to demonstrate the application of the underlying principles. It is further to be noted that in describing the figures numerals have been applied in detail only to such parts of the mechanism as are new and different from the mechanism disclosed in my aforesaid copending application, Serial No. 421,530, the other parts being designated by numerals only to the extent necessary for their proper identification.

Figure 2:
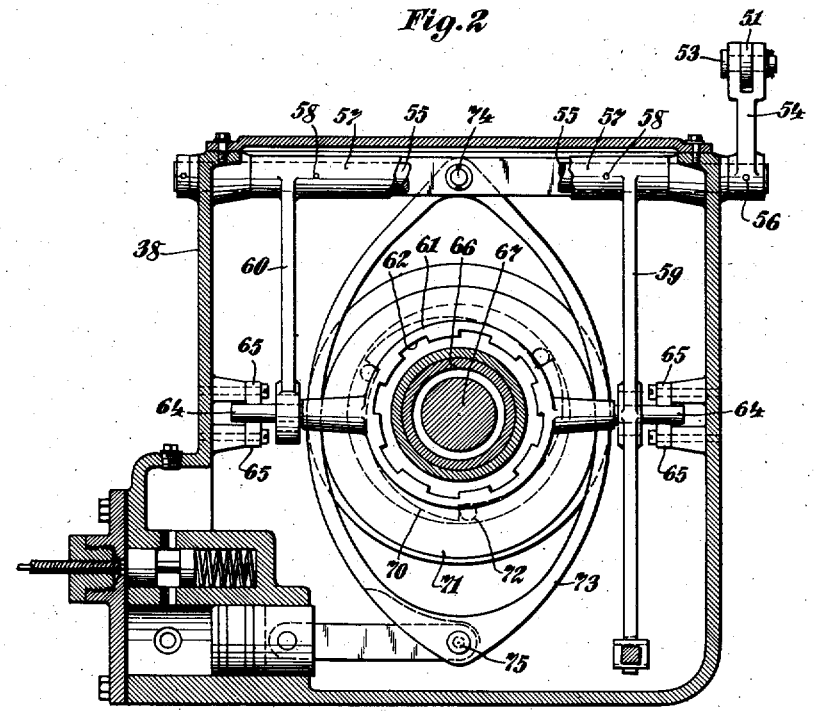
Figure 7:
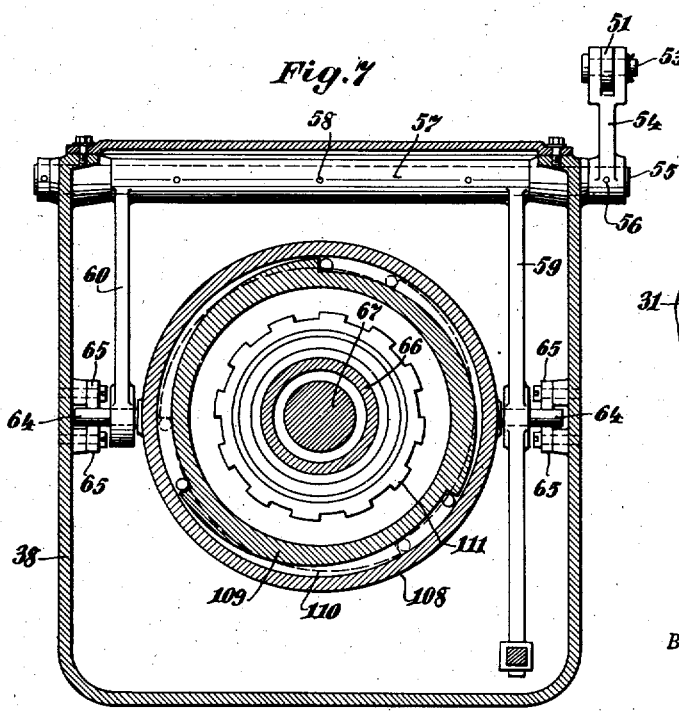
Figure 3:
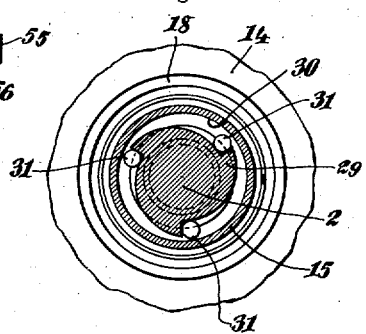

In the drawings, Figure 1 is an axial cross section of one embodiment of the present invention. Figure 2 is a cross section taken along the line 2—2 of Figure 1. Figure 3 is a cross section taken along the line 3—3 of Figure 1. Figure 4 is a portion of a cross section similar to that shown in Figure 1, but for another and preferred embodiment of the invention. Figure 5 is a cross section taken along the line 5—5 of Figure 4. Figure 6 is a portion of a cross section similar to that shown in Figure 1 but for still another modification of the device. Figure 7 is a cross section taken along the line 7—7 of Figure 6.

Referring to Figures 1-3 in detail, 1 is the end of the driving shaft of a motor vehicle, 2 is a shaft coaxial with the shaft 1. On the shaft 2, splined thereto, is a sleeve 3 of a skirt like form. A fluid coupling forms a part of the transmission here illustrated, this fluid coupling comprising an impeller and two impelled members, one of the latter being designated as a runner. The impeller 4 is integral with a hub 5 secured to the shaft 1, as by screws 6, and is rotatable about the shaft 2 on the sleeve 3, as on ball bearings shown but not numbered. The impeller 4 is provided with blades 7. The runner 8, with its blades 9, is secured to the shaft 2 through the connections 11 with the flange 10 of the skirt like sleeve 3. The third member of the fluid coupling, the impelled member 12 with its blades 13, is secured to the flange 14 of a hollow shaft 15 coaxial with the shaft 2 and rotatable thereon on ball bearings at one end and on a bushing at the other, neither one of said bearings being designated by numerals. The casing of the fluid coupling is completed by the wall 16 which is sealingly secured to the impeller 4 at 17 and to the hollow shaft 15 at 18. To the casing of the fluid coupling is secured a drum 19 which is engageable by an elastic expansible member 20 of the type disclosed in my aforesaid copending application, Ser. No. 421,530, and in another copending application, Ser. No. 465,187. In view of these complete and detailed prior disclosures, it is deemed unnecessary to describe the member 20 in detail, except to say that, as here shown, it includes the peripheral segments and facing. The member 20 is splined to the shaft 15 through the intermediary of the rings 21 and 22 and the pins 23. The usual self starter ring gear is indicated at 28. The entire assembly comprising the fluid coupling is contained in a housing 27 secured to the motor housing at 28'. An over-running clutch is interposed between the two shafts 2 and 15. This clutch comprises an inner member 29 integral with the shaft 2, and an outer member 30 integral with the shaft 15, a set of rollers 31 being provided between the inner and the outer members. As will be later explained, this over-running clutch may be omitted from the device.

Passing now to the right of the fluid coupling assembly, 24 is a hollow shaft secured to the ring 21, as by bolts 25, coaxially with the shaft 2. To facilitate assembly, the shaft 2 is broken up into two parts, coupled together at 26. A sun gear 32 of a planetary gear assembly is carried by the shaft 2. Freely rotatable on the shaft 2 is a spider 33 in which are journalled pinions 35 on spindles 34. The pinions 35 are in mesh with the sun gear 32 and with a planetary ring gear 36 supported on and freely rotatable on ball bearings in ring 37, the latter forming a part of the housing 38. The spider 33 has annular teeth 39 which are engageable with the teeth 40 of a clutch 41 slidably splined on the hollow shaft 24. In the clutch 41 is a groove 42 to receive pins or rollers 43 extending from an arm 44 of a hollow tube 45. In the hollow tube 45 is a rod 46 secured to the tube 45 as by pins 47. Another arm 48 is secured to the rod 46 by a pin 49. The arm 48, a manually operated rod 50, and a link 51, are pivotally connected as by a pin 52. The link 51 is pivotally connected, as through a pin 53, to another arm 54. The arm 54 is fixed to a shaft 55, as by a pin 56, the shaft 55 residing within a hollow tube 57 to which the shaft 55 is secured by pins 58. Extending from the tube 57 are two arms 59 and 60 which operate a clutch 61 having annular teeth 62 and 63 and slidable on the hollow shaft 66. The hollow shaft 66 is coaxial with the shaft 67, the latter being piloted on the end portion of shaft 2 of reduced diameter. A suitable bushing is provided between the clutch 61 and the hollow shaft 66. From the clutch 61 extend pins 64 guidingly held between two plates 65, 65, to prevent rotary motion of the clutch 61. On the shaft 67 is splined a spider 68 forming another set of bearings for the spindles 34 of the pinions 35. The hollow shaft 66 is connected to the planetary ring gear 36 as by bolts 69.

The device is provided with an over-running clutch having an inner member 70 integral with the hollow shaft 66 and an outer member 71 free to rotate on the shaft 66, the usual rollers 72 being intermediate the inner and the outer members of the clutch. The member 71 is outwardly cam shaped for engagement with yoke 73, a device disclosed in detail in my aforesaid copending application, Ser. No. 421,530. As in the former disclosure, the yoke 73 is pivoted at one end in the housing 38 for oscillation about a point 74 and, at the other end, 75, linked to a piston forming a part of a hydraulic control device. The outer member 71 of the over-running clutch is provided with an annular row of teeth 76 engageable by the teeth 63 of the sliding clutch 61. A planetary ring gear 77 is bolted to a pair of discs 78 and 79, the disc 78 being rotatably carried on shaft 66, and the disc 79 being rotatably carried on the end cover 80 of the housing 38. The disc 78 is provided with an annular row of teeth 81 engageable with the teeth 62 of the sliding clutch 61. A sun gear 82 is splined to the hollow shaft 66. Pinions 83 are journalled in spiders 84 and 85, 84 being splined to shaft 67, and spider 85 being rotatably supported on shaft 66. On the end of shaft 67 is the usual flanged driven member 86.

Latching means are provided for securing the transmission in four positions, namely, two forward, one neutral and one reverse, similar to the means illustrated in Figure 1 of my copending application, Ser. No. 421,530. Three of these four positions are indicated in Figure 1 of the present application by dash-dot lines.

In Figure 4 is shown another arrangement for connecting the driven shaft to the impelled member 12 and disconnecting this shaft from the impelled member. This is the arrangement which I prefer because of its semi-automatic nature and because it does away with the use of gear shifts. Instead of the teeth 39 on the spider 33, we have now a projection or boss 90 extending from the spider 33 and provided with a latch stop pin 91. Pivoted in the boss 90, at 92, is a three-fingered member 93, the fingers being designated by the numerals 94, 95, 96. A double acting tension spring 97 is attached to the boss 90 at a fixed point 98 and at a point 99 off the central line 92—98. The shaft 24 has three slots 100, 101, 102, engageable by the fingers 96. A movable ring 103, mounted in the housing 38 in the same manner as the sliding clutch 61 in Figure 2, except that the ends 104 of the pins 64 are now squared to prevent the ring 103 from deviating from its vertical position, is operated by the arm 44 to press upon the fingers 94. The parts shown in Figure 4 in full lines correspond to the neutral position of the transmission. When the ring 103 reaches the position partly indicated in dotted lines, the trigger action of the member 93 will cause the fingers 96 to enter the slots 100, 101 and 102.

In Figure 6 is shown a modification of the arrangement provided by the clutch 61. In this case, there is no over-running clutch 70, 71, 72, but a drum like member 105 integral with the shaft 66, having a cam shaped outer surface 106. The member 105 is provided with teeth 107 taking the place of the teeth 76 in Figure 1. In the present modification, two one way clutches are provided in lieu of the over-running clutch 70, 71, 72, one for the forward phase of the transmission, and the other for the reverse phase. The two clutches have a common outer member 108, but separate inner members 109 and 110. The member 109 has teeth 111 engageable with the teeth 81 which are alike to the teeth 81 in Figure 1, and the member 110 has teeth 112 engageable with the teeth 107. The cam surfaces of the two inner members are arranged for action in opposite directions, as is shown in Figure 7, in full lines for the member 100, and in dotted lines for the member 110. The common outer member 108 of the two one way clutches is non-rotatably secured to the arms 59 and 60 which are operated in a manner similar to that described for the clutch 61 in Figure 1.

It is to be understood that the yoke 73, which in Figure 1 embraces the cam shaped outer surface of the over-running clutch member 71, now embraces the similarly cam shaped outer surface 108 of the member 100. The yoke has been omitted together with its accompanying parts from Figure 6 in order to simplify the drawings, which clearly show how Figure 6 fits into Figure 1. The operation of the yoke 73 remains the same as in Figure 1 and as disclosed in detail in my copending application, Ser. No. 421,530.

Throughout this specification and the claims, the terms "forward" and "reverse" are meant to refer to the direction of rotation of the shafts, the forward direction being that of the driving shaft 1.

The operation of the device will be explained now. Taking up, first, the case illustrated in Figure 1, but omitting for the present the over-running clutch between the shafts 2 and 15, it will be noted that the transmission, as shown in Figure 1, is in its neutral phase. When the operating rod 50 is moved in the direction which causes the sliding clutch 41 to assume the position at which engagement between the teeth 39 and 40 is effected, i. e., the position indicated in Figure 1 by the first dash-dot line to the left of the neutral position, the hollow shaft 24 is caused to become directly connected with the driven shaft 67 through the spiders 33 and 68, and the spindles 34, and, in so far as the transmission in forward drive is concerned, the operation of the mechanism becomes identical with that disclosed in my copending application, Ser. No. 421,-530. When the rod 50 is moved to cause the clutch 41 to assume either one of the other positions indicated by dash-dot lines, i. e., the one on the extreme left, or the one to the right of the neutral position, the teeth 39 and 40 will become disengaged, and the shaft 24, and with it the shaft 15 and impelled member 12, will become disconnected from the driven shaft 67. Thus relieved of the load on the shaft 67, the speed of rotation of the shaft 15 and of the impelled member 12 will rapidly rise, generating centrifugal forces in the expansible (rubber) element of the clutch 20 which will cause it to firmly engage the drum 19. As a consequence, the member 12 will now be driven by the shaft 1, just as the impeller 4 is driven by this shaft. In other words, the function of the impelled member 12 has now been changed to that of an impeller.

One of the results of this change is that the power actually transmitted through the fluid coupling is substantially increased, or, perhaps, more correctly stated, there is a substantial reduction in power loss within the fluid coupling itself.

Of course, every time the rod 50 is moved, not only the clutch 41, but the clutch 61 also is shifted, the latter assuming that one of the several positions indicated by the dash-dot lines which corresponds to the position assumed by the clutch 41. It will be noted that when the teeth 39 and 40 are fully engaged, the teeth 63 and 76 are only engaged half way, i. e., the shaft 24 and the driven shaft 67 are locked together when the teeth 63 and 76 are engaged half way, and unlocked when the teeth 63 and 76 are either disengaged or engaged all the way.

Next, taking up the same device, as illustrated in Figure 1, but including the over-running clutch 29—30—31, omitted in the previously discussed case, when the shaft 24 is in engagement with the driven shaft 67 in the manner above described, the addition of this over-running clutch will not change the principle of operation, which remains the same as in the previously discussed case. But when the shaft 24 is disconnected from the driven shaft 67, the increased speed of rotation of the impelled member 12 will cause the shaft 15 to overrun the shaft 2, thereby effecting engagement of the rollers 31 with the outer and the inner members of the clutch and locking the shafts 2 and 15 together, so that the power delivered by the impelled member 12 is now added to that delivered by the runner 3. Comparing this case with the one previously discussed, it may be said that, while the function of the impelled member was changed to that of an impeller in the former case, it is changed to that of the runner in the present case. The additional power thus transmitted to the sun gear 32 means a substantial torque amplification through the planetary gear mechanism. As the speed of rotation of the intermediary shaft 2 increases, it may reach a predetermined value at which the centrifugal clutch 20, rotating in unison with the shafts 15 and 2, engages the drum 19. The clutch 20 is designed, of course, to operate at and above such a predetermined speed of rotation. At the moment when engagement between the clutch 20 and the drum 19 is effected, the runner 3 and the impelled member 12 jointly become tied to the driving shaft 1, i. e., a direct 1:1 power transmission without slippage is effected from the driving shaft 1 to the sun gear 32 of the speed rate changing mechanism.

It will readily be seen from the above analysis that my present improved transmission mechanism is highly flexible and adapted to meet a great variety of conditions, by means in part fully automatic, and in part manually operated, as will be better understood after perusal of the remaining part of the specification.

The operation of the clutch mechanism illustrated in Figures 4 and 5 will now be explained. When the rod 50 is moved to the right in the drawings, to the extent for which the teeth 63 and 76 are only engaged half way, the ring 103 will contact with the fingers 94 but will not alter the position of the three fingered member 93, the ring 103 in this case assuming the position half way between the one indicated in the figure by full lines and the one indicated by dash-dot lines. (It was not convenient to indicate this intermediate position of the ring 103 on the figure without too much crowding of details.) But when the rod 50 is moved farther in the same direction, until the teeth 63 and 76 are engaged all the way, the ring 103 will assume the position indicated by dash-dot lines, corresponding to the extreme left position of the clutch 41 in Figure 1. At this moment, the fingers 96, owing to the action of the eccentrically mounted springs 97, will snap into the slots 100, 101 and 102, locking the shaft 24 to the driven shaft 67. It will be noted that the slots 101 and 102 are wider than the slot 100. This is done to make sure that at least one of the fingers 96 will freely enter a slot, after which the other fingers will fall in more easily. When the fingers 96 have entered the slots in the shaft 24, the fingers 95 will have moved to positions abutting the ring 102 on the right side. When, therefore, the rod 50 is moved back, i. e., to the left in the figure, the ring 102 will press the fingers 95 away from the vertical until the action of the eccentrically mounted springs 97 forces the three-fingered member 93 to turn clockwise, thereby extricating the fingers 96 from the slots in the shaft 24 and unlocking this shaft from the driven shaft 87.

While the principle of operation of the clutch 41 and the one illustrated in Figures 4 and 5 is the same, it will be noted that the locked condition of the shafts 24 and 87, in one case, corresponds to the half way engagement of the teeth 63 and 76 of the clutch 61, and the unlocked condition of these shafts to the complete engagement of these teeth, while, in the other case, the locked condition of the two shafts corresponds to the complete engagement of the teeth 63 and 76, and the unlocked condition to the half way engagement of these teeth.

Going back to Figure 1, to put the transmission in reverse, the rod 50 is moved to the left, effecting engagement of the teeth 62 and 61 and disengaging the clutch 41. In so far as the operation of the clutch 61 is concerned, it is identical with that disclosed in my copending application, Ser. No. 421,530, but a difference of effect arises here owing to the unlocking of the shafts 24 and 87 from one another. The effect of this unlocking, whether the over-running clutch 28—30—31 is included, or not, is to substantially reduce power losses and to increase the torque transmitted through the planetary gear assembly, so that the increased efficiency obtained by the present arrangement in the forward transmission is also materialized in the reverse transmission, although the shaft 87 is still driven at a reduced speed through the second planetary gear assembly, as in the device disclosed in the aforesaid copending application, Ser. No. 421,530.

A further improvement is effected by the alternate arrangement illustrated in Figures 6 and 7, wherein the single over-running clutch 70—71—72 of Figure 1 is replaced by two one way clutches 108, 109, and 108, 110, the cam shaped surfaces of the inner members 109 and 110 of these clutches being formed to act in opposite senses. These cam shaped surfaces are shown in Figure 7 in full lines for the member 109, and in broken lines for the member 110. When the transmission is in its forward phase, moving the rod 50 to the right far enough to effect a half way engagement of the teeth 112 and 107, will lock the shafts 24 and 87 in the type of transmission illustrated in Figure 1, and will unlock these shafts when the teeth 112 and 107 are completely engaged. If the clutch mechanism illustrated in Figures 4 and 5 is used, the shafts 24 and 87 will be locked when the teeth 112 and 107 are engaged all the way, and will be unlocked when these teeth are engaged only half way or when they are disengaged. In so far as the transmission in the forward phase is concerned, therefore, nothing new is added by the change from Figure 1 to the alternate arrangement of Figure 6. But this alternate arrangement makes a substantial improvement in the reverse phase of the transmission. Instead of a reverse transmission at a low speed only, as in my prior application, Ser. No. 421,530, the new arrangement shown in Figures 6 and 7 provides a range of speeds as wide as that for the forward phase, except only the 1:1 direct transmission without slippage effected in the forward phase when all the driving and driven parts of the transmission are locked together for rotation as a unit.

The operation may be further illustrated as applied to the case of a motor vehicle. As in my former repeatedly referred to transmission, it automatically adjusts itself to the load on the driven shaft. Consider the operation starting from rest. The transmission is in its neutral phase. The impelled member 12 and driven shaft 87 are disconnected. To start the vehicle in the forward direction, the rod 50 is moved to the right until the teeth 112 of the one way clutch 108—110 are engaged all the way (when the type illustrated in Figure 1 is used) or half way (when the type illustrated in Figure 4 is used). This leaves the impelled member 12 disengaged from the shaft 87. The transmission now operates through the first planetary gear mechanism, at a low speed but high torque. The sun gear 32 rotates with the shaft 2 in the forward direction, causing the pinions 35 to rotate in the reverse direction about their spindles 34, the latter being momentarily held stationary by the inertia of the vehicle at rest. The initial impact on the ring gear 36 by the pinions 35 is in the reverse direction, and this initial impact is communicated to the member 110 of the one way clutch 108—110 through the engaged teeth 107 and 112, locking the clutch and thereby holding the ring gear 36 against rotation. With the ring gear held stationary, the pinions 35 will rotate around the sun gear 32 at a low speed which will gradually increase, as will be clear from the next step in the operation. At this time, i. e., after the shaft 87 has been caused to rotate at the low speed, the impelled member 12 is connected to the shaft 87 by moving the rod 50 further to the right until the teeth 112 and 107 are engaged all the way (when the type of clutch shown in Figures 4 and 5 is used) or moving the rod 50 back until the teeth 112 and 107 are only half way engaged (when the type of clutch shown in Figure 1 is used). The joint action of the direct power transmission from the now engaged impelled member 12 to the shaft 87, together with the action of the indirect transmission through the first planetary gear mechanism, causes the shaft 87 to rapidly increase in speed of rotation, and this joint action will cause the ring gear 36 to be released for rotation in the forward direction, also releasing the lock on the one way clutch 108—110. Thus, the transmission automatically passes from its low speed, high torque phase to its high speed phase with, however, some slippage in part due to slippage in the fluid coupling. From this stage of high speed transmission with slippage the transmission, again automatically, passes into direct 1:1 transmission without slippage through the action of the centrifugal clutch 20 in the manner fully disclosed in my copending application, Ser. No. 421,530, and, therefore, not further discussed here.

To start the vehicle in the reverse direction from rest (shifting the transmission from one direction to the one opposite is always accomplished by first bringing the vehicle to rest, with the transmission in its neutral phase), the rod 50 is moved to the left until the teeth 62 are engaged with the teeth 81. This leaves the impelled member 12 and clutch 28 disconnected from the shaft 67. The ring gear 36 and the shaft 66 secured to the ring gear 36 through the member 105, are now rotating in reverse. So, also, is the sun gear 82 mounted on the hollow shaft 66. The pinions 83 rotate in the forward direction on their spindlies. The initial impact on the ring gear 77 is in the forward direction, which is communicated to the member 109 of the one way clutch 108—109 through the engaged teeth 111 and 81, locking this clutch and thereby holding the ring gear 77 against rotation. With the ring gear 77 held stationary, the pinions 83 rotate in the reverse direction around the sun gear 82, driving the shaft 67 in the reverse direction. As the speed of rotation of the hollow shaft 66 increases, the ring gear 77 is released for rotation in the reverse direction, at the same time unlocking the clutch 108—109, whereupon the rotation of the shaft 67 will proceed at a gradually increasing speed until it reaches the speed of the slippage allowing direct transmission, but in the reverse direction. The transition from low speed, torque amplified transmission to direct, slippage allowing transmission at high speed, as in the case of the transmission in the forward direction, proceeds automatically.

When shifting the transmission from the neutral phase to one or the other of the drive phases, it is necessary to hold the teeth 76 in Figure 1, or the teeth 107 in Figure 6 against rotation. When this is done, the teeth 81 will be held against rotation, as will be presently explained. In Figures 1 and 2, the mechanism for doing this is identical with the one described in my copending application, Ser. No. 421,530, and illustrated therein Figures 5–7. When the arrangement shown in Figures 6 and 7 of the present application is adopted, a similar mechanism is employed, the only difference being that the pendulous yoke 73 now embraces the cam shaped surface 106 of the member 105, instead of the cam shaped outer surface of the over-running clutch 70—71 of Figure 1. It is not necessary, therefore to go into a detailed description and operation of the device.

As to the teeth 81, which must remain stationary when the transmission is shifted into reverse, they meet this requirement for the following reason. When the teeth 76 are held against rotation in Figure 1, this is accomplished by holding the clutch member 70 stationary; when the teeth 107 are held against rotation in Figure 6, this is accomplished by holding the member 105 stationary. In either case, this will hold the hollow shaft 66 against rotation, and since the sun gear 82 is mounted to rotate with the shaft 66, the sun gear 82 is now held against rotation. The vehicle being at rest, the spindles of the pinions 83 are also held stationary, so that these pinions can not rotate either about their spindles or around the sun gear 82. Consequently, the ring gear 77 is now held against rotation, and, therefore, the teeth 81 also are so held.

It is desired to again emphasize the fact that in the present type of transmission, owing to the feature of selective engagement and disengagement of the shaft 15—24 and the impelled member 12, to and from the driven shaft 67, there is no undue drag on the motor. When the transmission is in its neutral phase, the impelled member blades, being disconnected from the shaft 67, are not held stationary by the inertia of the vehicle at rest and, therefore, they do not offer any resistance to the rotation of the impeller blades. It will be noted, also, that the impelled member blades, during the reverse phase of the transmission, do not turn in the reverse direction with the shaft 67 from which they are disengaged. It is also desired to emphasize the unique feature of the ability of transferring the functions of the impeller and of the centrifugal clutch whenever desired from their normal direct drive range to the emergency low speed, high torque range, and back again to their normal functions. This and other novel features of the present transmission endow it with a high degree of flexibility and ready adaptability to various conditions which it is not possible to meet in transmission mechanisms in use today.

The various details of construction shown are not to be understood as intended to limit the scope of the invention, many variations, additions and omissions being possible without in any way affecting the principles involved or the application of these principles as herein illustrated.

I claim:

1. A power transmission mechanism comprising means for transmitting a portion of said power directly from a driving shaft to a driven shaft, means for transmitting the remainder of said power through a torque multiplying mechanism, and means for bodily transferring said power portion from said direct transmitting means to said torque multiplying mechanism and back again.

2. In a power transmission mechanism, means for transmitting power from a driving shaft to a driven shaft, including a fluid coupling, the latter comprising an impeller actuated by said driving shaft, at least one impelled member, releasable means for directly connecting said impelled member with said driven shaft, and means for changing the function of said impelled member to that of an impeller when said impelled member is disconnected from said driven shaft.

3. In a power transmission mechanism, means for transmitting power from a driving shaft to a driven shaft, including a fluid coupling, the latter comprising an impeller actuated by said driving shaft, at least one impelled member, releasable means for directly connecting said impelled member with said driven shaft, and means, responsive to centrifugal forces generated by the rotation of said impelled member when it is disconnected from said driven shaft for changing the function of said impelled member to that of an impeller.

4. A power transmission mechanism according to claim 2 wherein the means releasably connecting the impelled member with the driven shaft comprise a clutch slidable parallel to the axis of the mechanism and provided with teeth, and teeth fixedly connected with said driven shaft for engagement with said clutch teeth.

5. A power transmission mechanism according to claim 2, wherein the means for releasably connecting the impelled member with the driven shaft comprise an extension member secured to and rotating with said impelled member, an extension member secured to and rotating with said driven shaft, and releasable locking means between said extension members.

6. A power transmission mechanism according to claim 2, wherein the means for releasably connecting the impelled member with the driven shaft comprise a sleeve secured to and rotating with said impelled member, slots in said sleeve, and releasable locking means including a spring actuated member adapted to engage said slots by a trigger action.

7. A power transmission mechanism according to claim 3, wherein the last mentioned means comprise a centrifugal clutch operative between the impelled member and the driving shaft.

8. A power transmission mechanism according to claim 3, wherein the last mentioned means comprise a drum, means locking said drum to the driving shaft, and an elastic expansible member connected to the impelled member for frictional engagement with said drum.

9. In a power transmission mechanism, means for transmitting power from a driving shaft to a driven shaft, including a fluid coupling, the latter comprising an impeller and members impelled thereby, and driving connections between said impelled members and said driven shaft, one of said connections being direct and releasable without releasing the other connections.

10. A power transmission mechanism according to claim 9, wherein the last mentioned means comprise a clutch slidable parallel to the axis of the mechanism, teeth on said clutch, and teeth fixedly connected with said driven shaft for engagement with said clutch teeth.

11. A power transmission mechanism according to claim 9, wherein the last mentioned means comprise an extension member connected to and rotating with the impelled member, an extension member connected to and rotating with the driven shaft, and releasable locking means between said extension members.

12. A power transmission mechanism according to claim 9, wherein the last mentioned means comprise a sleeve connected to and rotating with the impelled member, slots in said sleeve, and releasable locking means including a spring actuated member adapted to engage said slots by a trigger action.

13. In a power transmission mechanism, means for transmitting power from a driving shaft to a driven shaft, including a speed rate changing mechanism and a fluid coupling, the latter comprising an impeller and members impelled thereby, one of said impelled members being operatively connected with said speed rate changing mechanism, and a second impelled member being releasably connected to said driven shaft for direct transmission of power thereto, and means for transferring said last mentioned power to said speed rate changing mechanism when said second impelled member is disconnected from said driven shaft.

14. A power transmission mechanism according to claim 13, wherein the last mentioned means comprise an over-running clutch operative between the two impelled members.

15. In a power transmission mechanism, means for transmitting power from a driving shaft to a driven shaft, including a speed rate changing mechanism and a fluid coupling, the latter comprising an impeller actuated by said driving shaft, an impelled member, means releasably connecting said impelled member with said driven shaft, a runner intermediate said impeller and said impelled member operatively connected with said speed rate changing mechanism, an intermediary shaft actuated by said runner, a sleeve on said intermediary shaft rotatable with said impelled member, and an over-running clutch between said sleeve and said intermediary shaft for causing the power transmitted by said impelled member to be transferred to said intermediary shaft when said impelled member is disconnected from said driven shaft.

16. In a power transmission mechanism, means for transmitting power from a driving shaft to a driven shaft, including a fluid coupling, the latter comprising an impeller and members impelled thereby, connections between said impelled members and said driven shaft, one of said connections being direct and releasable without releasing the other connections with said driven shaft, means for controlling said releasable connection, means for shifting the transmission from its neutral phase to a driving phase in one or the opposite direction, and means for jointly operating said control means and shifting means.

17. A power transmission mechanism according to claim 16, wherein the last mentioned means comprise a rock shaft associated with said control means and a rock shaft associated with said shifting means and a linkage between said rock shafts, and means operable at a remote point for actuating said linkage.

18. A power transmission mechanism according to claim 16, wherein said control means and said shifting means are slidable simultaneously and in the same direction parallel to the axis of the mechanism, the connection between the impelled member and the driven shaft being established when the said shifting means is half way along its sliding range, and the connection being severed when said shifting means is at the end of its sliding range or entirely out of it.

19. In a power transmission mechanism, means for transmitting power from a driving shaft to a driven shaft, including a planetary gear assembly for transmission in one direction, a one way clutch associated with said planetary gear assembly for controlling the transmission in said direction, a second planetary gear assembly for transmission in the opposite direction, a one way clutch associated with said second gear assembly for controlling the transmission in said opposite direction, and means for selectively engaging one or the other of said one way clutches with the planetary gear assembly with which it is associated.

20. In a power transmission mechanism, means for transmitting power from a driving shaft to a driven shaft, including a planetary reduction gear assembly, a planetary ring gear forming a part of said gear assembly, a clutch having a member free to rotate in one direction only, said clutch member being engageable with said planetary ring gear for rotation therewith, a second planetary gear assembly, a ring gear forming part of said second gear assembly, a second clutch having a member free to rotate in one direction only opposite to the direction in which said first mentioned clutch is free to rotate, the rotatable member of said second clutch being engageable with the ring gear of said second planetary gear assembly, and means for selectively establishing engagement of one or the other of said rotatable clutch members with the corresponding ring gear of said planetary gear assemblies.

21. A power transmission mechanism according to claim 20, wherein the last mentioned means comprise teeth on the rotatable clutch members, teeth on portions of the mechanism secured to the planetary ring gears, and means for selectively engaging the teeth of one or the other of said rotatable clutch members with the teeth of the portion of the mechanism secured to the corresponding planetary ring gear.

22. In a power transmission mechanism, means for transmitting power from a driving shaft to a driven shaft, including a fluid coupling, the latter comprising an impeller actuated by said driving shaft, and impelled members, one of said impelled members being releasably connected with said driven shaft, a reduction gear assembly for transmission in one direction, a one way clutch associated with said reduction gear assembly, a second reduction gear assembly for transmission in the opposite direction, a one way clutch associated with said second gear assembly, means for operating the connection between said driven shaft and the impelled member releasably connected thereto, and means for selectively engaging one or the other of said one way clutches with the reduction gear assembly with which it is associated, the last mentioned means being operable jointly with said means for operating the connection between the driven shaft and the impelled member releasably connected thereto.

23. In a power transmission mechanism, means for transmitting power from a driving shaft to a driven shaft, including a fluid coupling, the latter comprising an impeller actuated by said driving shaft and impelled members, one of said impelled members being releasably connected with said driven shaft, a planetary gear assembly for transmission in the reverse direction, a ring gear forming a part of said gear assembly, a clutch having a member free to rotate in said reverse direction only and engageable with said ring gear, and means disconnecting said impelled member from said driven shaft when engagement of said rotatable clutch member with said ring gear is effected.

24. In a power transmission mechanism, means for transmitting power from a driving shaft to a driven shaft, including a speed rate changing mechanism and a fluid coupling, the latter comprising an impeller actuated by said driving shaft, and impelled members, one of said impelled members being operatively connected with said speed rate changing mechanism, and a second impelled member being releasably connected with said driven shaft for direct power transmission thereto, means for causing said two impelled members to rotate as a unit when said second impelled member is disconnected from said driven shaft, and means for establishing a direct power transmission without slippage from said driving shaft to said speed rate changing mechanism when the rotation of said unit attains a predetermined speed.

25. In a power transmission mechanism, means for transmitting power from a driving shaft to a driven shaft, including a speed rate changing mechanism and a fluid coupling, the latter comprising an impeller actuated by said driving shaft, an impelled member, means releasably connecting said impelled member with said driven shaft, a runner intermediate said impeller and said impelled member operatively connected with said speed rate changing mechanism, an intermediary shaft actuated by said runner, a hollow shaft around said intermediary shaft coaxial therewith and rotatable with said impelled member, an overrunning clutch between said intermediary shaft and said hollow shaft for causing the two last mentioned shafts to rotate as a unit when said impelled member is disconnected from said driven shaft, and a centrifugal clutch operative when the rotation of said unit attains a predetermined speed, for establishing a direct 1:1 transmission from said driving shaft to said speed rate changing mechanism.

26. A power transmission mechanism according to claim 25, wherein the centrifugal clutch includes an elastic expansible element, and a member secured to the driving shaft engageable by said expansible elment.

27. In a power transmission mechanism, means for transmitting power from a driving shaft to a driven shaft, means for reversing the direction of the transmission, a clutch cooperating with said reversing means, a member engageable by said clutch having a cam shaped outer surface, means for holding said member against rotation while shifting the transmission, said last mentioned means comprising a pendulous yoke embracing said cam shaped surface, whereby said member can rotate only when said yoke is free to oscillate, and means for controlling the oscillation of said yoke.

28. In a power transmission mechanism, means for transmitting power from a driving shaft to a driven shaft, including a planetary gear mechanism, a ring gear forming a part of this planetary gear mechanism, means for reversing the direction of the transmission, a member rotatable with said ring gear having a cam shaped outer surface, means for holding said member against rotation while shifting the transmission, said last mentioned means comprising a pendulous yoke embracing said cam shaped surface, whereby said ring gear can rotate only when said yoke is free to oscillate, and means for controlling the oscillation of said yoke.

29. In a power transmission, means for transmitting power from a driving shaft to a driven shaft, including a set of engageable elements for driving said driven shaft in one direction when said elements are in engagement, another set of engageable elements for driving said driven shaft in the opposite direction when the elements of said other set are in engagement, a clutch for controlling the shifting of the engagement from one to the other of said sets of elements and their disengagement, a fluid coupling comprising an impeller and members impelled thereby, driving connections between said impelled members and said driven shaft, one of said connections being direct and releasable without releasing the other connections, a clutch for controlling said releasable connection, and means for jointly operating said clutches.

30. In a power transmission from a driving shaft to a driven shaft, means for driving said driven shaft in the same or in the opposite direction to that of said driving shaft, including a fluid coupling comprising an impeller and members impelled thereby, driving connections between said impelled members and said driven shaft, one of said connections being direct and releasable without releasing the other connections, and means for selectively holding said impelled member connected to or disconnected from said driven shaft while said driven shaft rotates in the same direction as said driving shaft.

31. A power transmission mechanism according to claim 30, wherein the second clutch includes an extension member secured to and rotating with the impelled member and a spring actuated member secured to said driven shaft and adapted to engage said extension member by a trigger action, while the first clutch is sliding parallel to the axis of the mechanism, the connection between the impelled member and the driven shaft being established when said first clutch is at the end of its sliding range, and being severed when said first clutch is half way along its sliding range or entirely out of it.

32. In a power transmission from a driving shaft to a driven shaft, means for driving said driven shaft in the same or in the opposite direction to that of said driving shaft, including a fluid coupling comprising an impeller and members impelled thereby, driving connections between said impelled members and said driven shaft, one of said connections being direct and releasable without releasing the other connections, and means for holding said impelled member out of connection with said driven shaft while said driven shaft rotates in said opposite direction.

33. A power transmission from a driving shaft to a driven shaft, including a fluid coupling, the latter comprising an impeller actuated by said driving shaft, an impelled member and an intermediate runner, both actuated by said impeller, releasable means for transmitting the power input of said impelled member directly to said driven shaft, means for transmitting the power input of said intermediate runner to said driven shaft through a torque multiplying mechanism, and means for transferring the power input of said direct transmission means to said torque multiplying mechanism and back again.

34. A mechanism for transmitting power from a driving shaft to a driven shaft, including a fluid coupling, the latter comprising an impeller actuated by said driving shaft, an impelled member and an intermediary runner, both actuated by said impeller, means for transmitting a portion of said power from said driving shaft directly to said driven shaft, means for transmitting the remainder of said power from said driving shaft to said driven shaft through a torque multiplying mechanism, and means for adding the power output of said impelled member to the power input of said runner.

35. A mechanism for transmitting power from a driving shaft to a driven shaft, including a fluid coupling, the latter comprising an impeller actuated by said driving shaft, an impelled member and an intermediary runner, both actuated by said impeller, releasable means for directly connecting said impelled member with said driven shaft, means connecting said intermediary runner with said driven shaft through a torque multiplying mechanism, and means for changing the function of said impelled member to that of said intermediary runner when said impelled member is disconnected from said driven shaft.

36. A mechanism for transmitting power from a driving shaft to a driven shaft, including a fluid coupling, the latter comprising an impeller actuated by said driving shaft, an impelled member and an intermediary runner, both actuated by said impeller, releasable means directly connecting said impelled member with said driven shaft, means connecting said runner with said driven shaft through a torque multiplying mechanism, and means for bypassing said fluid coupling and establishing a direct 1:1 driving connection between said driving shaft and said torque multiplying mechanism by disconnecting said impelled member from said driven shaft.

37. A mechanism according to claim 36, wherein the means for bypassing the fluid coupling and establishing a direct 1:1 driving connection between the driving shaft and the torque multiplying mechanism includes a centrifugal clutch operative between the impelled member and the driving shaft.

38. In a power transmission, a driving shaft, a driven shaft, a torque multiplying mechanism, means for simultaneously transmitting power from said driving shaft to said driven shaft directly through a releasable connection between said two shafts and directly through said torque multiplying mechanism, and means for causing the power transmittable through said releasable connection to be diverted to said torque multiplying mechanism when said releasable connection is released.

ALBERT D. PENTZ.

CERTIFICATE OF CORRECTION.

Patent No. 2,381,772.   August 7, 1945.

ALBERT D. PENTZ.

It is hereby certified that error appears in the printed specification of the above numbered patent requiring correction as follows: Page 7, second column, line 65, claim 31, for the claim reference numeral "30" read --29--; page 8, second column, line 37, claim 38, for "directly" read --indirectly--; and that the said Letters Patent should be read with this correction therein that the same may conform to the record of the case in the Patent Office.

Signed and sealed this 13th day of November, A. D. 1945.

Leslie Frazer (Seal)   First Assistant Commissioner of Patents.

severed when said first clutch is half way along its sliding range or entirely out of it.

32. In a power transmission from a driving shaft to a driven shaft, means for driving said driven shaft in the same or in the opposite direction to that of said driving shaft, including a fluid coupling comprising an impeller and members impelled thereby, driving connections between said impelled members and said driven shaft, one of said connections being direct and releasable without releasing the other connections, and means for holding said impelled member out of connection with said driven shaft while said driven shaft rotates in said opposite direction.

33. A power transmission from a driving shaft to a driven shaft, including a fluid coupling, the latter comprising an impeller actuated by said driving shaft, an impelled member and an intermediate runner, both actuated by said impeller, releasable means for transmitting the power input of said impelled member directly to said driven shaft, means for transmitting the power input of said intermediate runner to said driven shaft through a torque multiplying mechanism, and means for transferring the power input of said direct transmission means to said torque multiplying mechanism and back again.

34. A mechanism for transmitting power from a driving shaft to a driven shaft, including a fluid coupling, the latter comprising an impeller actuated by said driving shaft, an impelled member and an intermediary runner, both actuated by said impeller, means for transmitting a portion of said power from said driving shaft directly to said driven shaft, means for transmitting the remainder of said power from said driving shaft to said driven shaft through a torque multiplying mechanism, and means for adding the power output of said impelled member to the power input of said runner.

35. A mechanism for transmitting power from a driving shaft to a driven shaft, including a fluid coupling, the latter comprising an impeller actuated by said driving shaft, an impelled member and an intermediary runner, both actuated by said impeller, releasable means for directly connecting said impelled member with said driven shaft, means connecting said intermediary runner with said driven shaft through a torque multiplying mechanism, and means for changing the function of said impelled member to that of said intermediary runner when said impelled member is disconnected from said driven shaft.

36. A mechanism for transmitting power from a driving shaft to a driven shaft, including a fluid coupling, the latter comprising an impeller actuated by said driving shaft, an impelled member and an intermediary runner, both actuated by said impeller, releasable means directly connecting said impelled member with said driven shaft, means connecting said runner with said driven shaft through a torque multiplying mechanism, and means for bypassing said fluid coupling and establishing a direct 1:1 driving connection between said driving shaft and said torque multiplying mechanism by disconnecting said impelled member from said driven shaft.

37. A mechanism according to claim 36, wherein the means for bypassing the fluid coupling and establishing a direct 1:1 driving connection between the driving shaft and the torque multiplying mechanism includes a centrifugal clutch operative between the impelled member and the driving shaft.

38. In a power transmission, a driving shaft, a driven shaft, a torque multiplying mechanism, means for simultaneously transmitting power from said driving shaft to said driven shaft directly through a releasable connection between said two shafts and directly through said torque multiplying mechanism, and means for causing the power transmittable through said releasable connection to be diverted to said torque multiplying mechanism when said releasable connection is released.

ALBERT D. PENTZ.

CERTIFICATE OF CORRECTION.

Patent No. 2,381,772.  August 7, 1945.

ALBERT D. PENTZ.

It is hereby certified that error appears in the printed specification of the above numbered patent requiring correction as follows: Page 7, second column, line 65, claim 31, for the claim reference numeral "30" read --29--; page 8, second column, line 37, claim 38, for "directly" read --indirectly--; and that the said Letters Patent should be read with this correction therein that the same may conform to the record of the case in the Patent Office.

Signed and sealed this 13th day of November, A. D. 1945.

Leslie Frazer (Seal) First Assistant Commissioner of Patents.